(12) United States Patent
Mugura et al.

(10) Patent No.: US 6,374,121 B1
(45) Date of Patent: Apr. 16, 2002

(54) SYSTEM AND METHOD FOR ENABLING AUTOMATIC PERFORMANCE OF INSTRUMENT FUNCTIONS

(75) Inventors: Kazuto Mugura, San Francisco, CA (US); Eduardo Sciammarella, New York, NY (US); Scott Kravitz, San Francisco, CA (US)

(73) Assignees: Sony Corporation (JP); Sony Electronics, Inc.

( * ) Notice: Subject to any disclaimer, the term of this patent is extended or adjusted under 35 U.S.C. 154(b) by 0 days.

(21) Appl. No.: 09/590,597

(22) Filed: Jun. 9, 2000

Related U.S. Application Data

(63) Continuation of application No. 09/006,550, filed on Jan. 13, 1998.

(51) Int. Cl.$^7$ .................................................. H04B 1/38
(52) U.S. Cl. ....................... 455/550; 455/426; 455/564; 455/566; 340/7.24; 340/7.51
(58) Field of Search ................................ 455/31.1, 31.2, 455/31.3, 403, 426, 550, 556, 564, 566, 575; 379/355, 356; 340/825.44, 7.1, 7.24, 7.25, 7.51, 7.55

(56) References Cited

U.S. PATENT DOCUMENTS

| | | | | |
|---|---|---|---|---|
| 5,099,507 A | * | 3/1992 | Mukai et al. | 379/355 |
| 5,274,693 A | * | 12/1993 | Waldman | 379/355 |
| 5,359,651 A | * | 10/1994 | Draganoff | 379/355 |
| 5,481,659 A | | 1/1996 | Nosaka et al. | 395/123 |
| 5,541,988 A | * | 7/1996 | Draganoff | 379/355 |
| 5,557,413 A | | 9/1996 | Ebihara et al. | 358/296 |
| 5,561,705 A | * | 10/1996 | Allard et al. | 455/564 |
| 5,615,045 A | | 3/1997 | Takuma et al. | 359/456 |
| 5,677,949 A | * | 10/1997 | Macor | 379/355 |
| 5,708,804 A | * | 1/1998 | Goodwin et al. | 379/355 |
| 5,848,356 A | * | 12/1998 | Jambhekar et al. | 455/403 |

* cited by examiner

*Primary Examiner*—Nay Maung
(74) *Attorney, Agent, or Firm*—Fulwider Patton Lee & Utecht, LLP

(57) ABSTRACT

An instrument includes a display screen which includes a bitmap graphical user interface including an on-screen menu, and a control element which enables movement of the on-screen menu corresponding to movement of the control element, enables the user to manipulate and select graphic images for executing selected instrument functions. The instrument is adapted to enable automatic performance of instrument functions.

10 Claims, 1 Drawing Sheet

SYSTEM AND METHOD FOR ENABLING AUTOMATIC PERFORMANCE OF INSTRUMENT FUNCTIONS

This application is a con of Ser. No. 09/006,550 filed Jan. 13, 1998.

BACKGROUND OF THE INVENTION

The present invention relates generally to an interface for a display screen and, more particularly, to a graphical user interface which, with a control device, enables manipulation of graphic images on a display screen.

In an instrument which includes a display screen, an on-screen menu, and a control device, a user may interact with the on-screen menu by viewing the on-screen menu, deciding to select a menu item, and manipulating the control device to generate menu movement and to enable entry of the menu selection.

The instrument may comprise a hand-held wireless telephone which includes an on-screen menu displayed in a text text-based interface on a small liquid-crystal display screen, and a jog dial control device for scrolling through the menu and for entry of a menu selection and execution of an instrument function thereby.

In an instrument which includes a display screen and control element, and which is adapted to enable selection of and connection to a telephone number, a user may wish to view the name of the party called or transmit a code for enabling connection to a service.

Therefore, there has been a need existing for a system which enables the user of an instrument to view the name of a party called or transmit a code required to connect with a service. The present invention fulfills these needs.

SUMMARY OF THE INVENTION

Briefly, and in general terms, the present invention provides an on-screen menu in an interactive graphical user interface, which provides for enabling display of the name of a party called or transmission of a code for connection to a service.

The system enables automatic performance of functions of an instrument. It includes means for enabling entry in the instrument of information relating to a party, and information associated with the related information. It further includes means for performing automatically an instrument function in connection with the related information and the associated information.

One aspect of the present invention is that a system enables the user to view and manipulate graphic images in an on-screen menu in an intuitive graphical user interface in a display screen.

Another aspect of the present invention is that a system enables the user to enter information related to a party and associated with the party, and automatically execute a function in connection with the related information and the associated information through an on-screen menu in a display screen in an instrument.

Other features and advantages of the invention will become apparent from following detailed description taken in conjunction with the accompanying drawings, which illustrate, by way of example, the features of the invention.

BRIEF DESCRIPTION OF THE DRAWINGS

The FIGURE is an elevational view of a display in an instrument which includes an on-screen menu in accordance with the present invention.

DETAILED DESCRIPTION OF THE PREFERRED EMBODIMENTS

Figure 1:
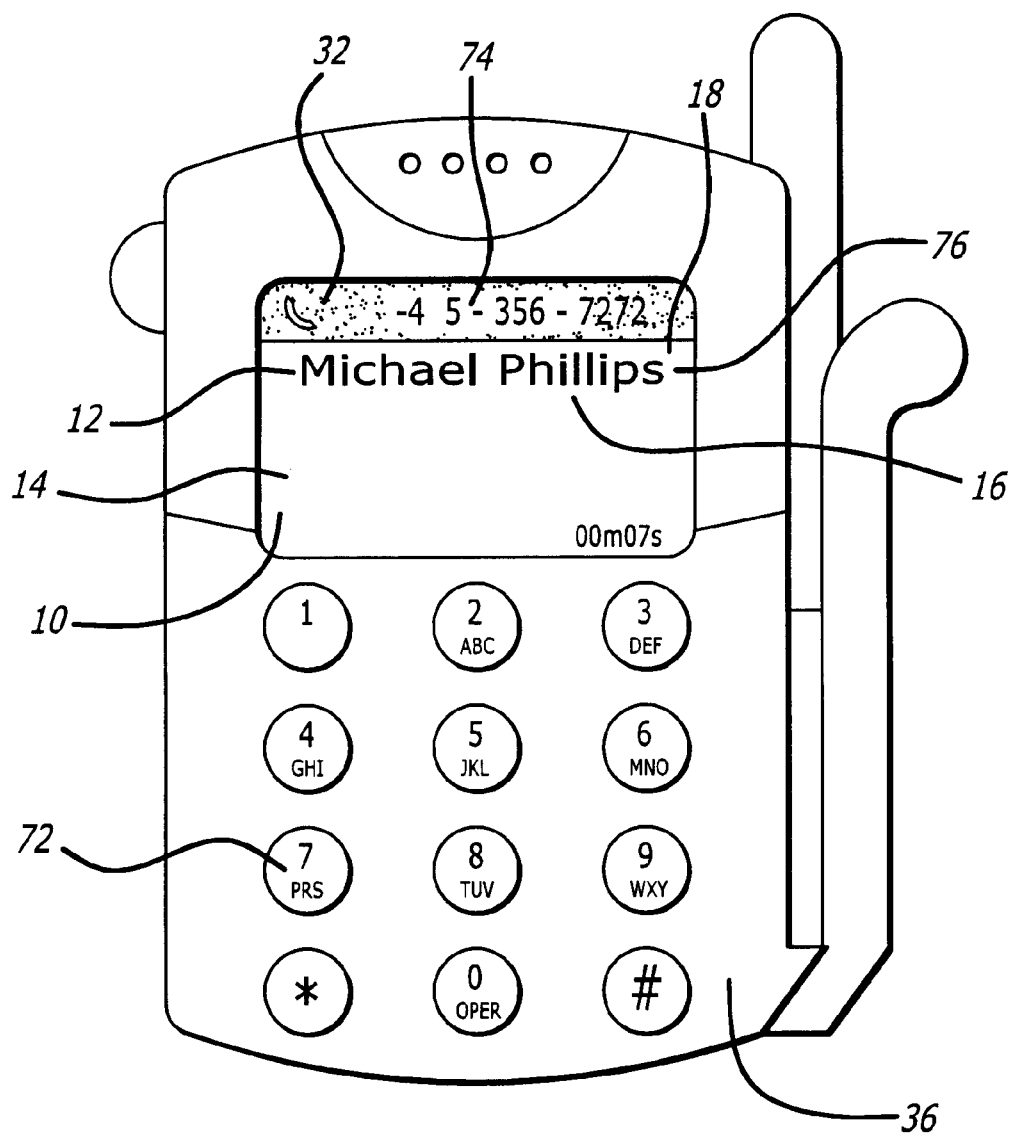

Referring now to the drawings, there are shown preferred embodiments of a system 10 for enabling manipulation of a plurality of graphic images 12 on a display screen 14. A graphical user interface 18 which comprises a bitmap display includes the graphic image 12 therein. In the screen 14 shown in the FIGURE, a header graphic image 32 is also presented.

In a preferred embodiment, as shown in FIGURE, system 10 is adapted to enable automatic performance of functions of an instrument 36. For example, instrument 36 may comprise a wireless telephone, which includes elements 72, such as a keypad, for enabling entry of information 74 relating to a party, such as the telephone number of the party, and information 76 associated with the party, such as the name of the party. Instrument 36 further includes a display screen 14, for displaying related information 74 and associated information 76. Instrument 36 is adapted to automatically display the name of the party associated with the telephone number of the party, upon entry of the telephone number of the party.

Instrument 36 may further or alternatively comprise a pager, which is adapted to connect instrument 36 to the telephone number entered, wherein related information 36 may comprise the telephone number of a paging service. Associated information 76 may comprise a personal identification number. Instrument 36 may then be adapted to automatically transmit the personal identification number to the paging service, upon connection of the entered telephone number with the paging service, for enabling connection of instrument 36 to the paging service.

From the foregoing it will be appreciated that the system of the present invention provides advantages in enabling automatic performance of instrument functions. While particular forms of the invention have been illustrated and described, it will be apparent that various modifications can be made without departing from the spirit and scope of the invention. Accordingly, the invention is not to be limited, except as by the following claims.

What is claimed is:

1. A system for enabling automatic performance of functions of an instrument which comprises a wireless telephone which includes a display screen, and means for displaying the telephone number on the display screen, comprising:

means for enabling entry and storage in the instrument of information relating to a party which comprises a telephone number, and information associated with the telephone number which comprises the name of the party associated with the telephone number; and means for performing automatically a function in connection with the associated information upon subsequent entry of the telephone number in the instrument to access the telephone number from storage and to automatically perform the associated information function, which comprises automatically accessing from storage and displaying the name of the party associated with the telephone number along with the entered telephone number on the display upon subsequent entry and access from storage of the telephone number.

2. A system for enabling automatic performance of functions of an instrument, which comprises a paging instrument, comprising:

means for enabling entry and storage in the instrument of information relating to a party, which comprises the telephone number of a paging service, and information associated with the telephone number, which comprises a personal identification number;

means for performing automatically a function in connection with the associated information, to access the telephone number from storage and transmit the telephone number, and to automatically perform the associated information function, which comprises automatically accessing from storage and transmitting the personal identification number to the paging service telephone number upon subsequent entry and access from storage of the telephone number in the instrument; and means for connecting the paging instrument to the paging service telephone number.

3. The system of claim 2, further comprising a display screen, and means for displaying the entered paging service telephone number on the display.

4. The system of claim 2 wherein the displaying means are further adapted to display the personal identification number.

5. A system for enabling automatic performance of functions of an instrument which comprises a wireless telephone which includes a display screen, and an element for displaying the telephone number on the display screen, comprising:

an element for enabling entry and storage in the instrument of information relating to a party which comprises a telephone number, and information associated with the telephone number which comprises the name of the party associated with the telephone number; and an element for performing automatically a function in connection with the associated information upon subsequent entry of the telephone number in the instrument to access the telephone number from storage and to automatically perform the associated information function, which comprises automatically accessing from storage and displaying the name of the party associated with the telephone number along with the entered telephone number on the display upon subsequent entry and access from storage of the telephone number.

6. A system for enabling automatic performance of functions of an instrument, which comprises a paging instrument, comprising:

an element for enabling entry and storage in the instrument of information relating to a party, which comprises the telephone number of a paging server, and information associated with the telephone number, which comprises a personal identification number;

an element for performing automatically a function in connection with the associated information, to access the telephone number from storage and transmit the telephone number, and to automatically perform the associated information function, which comprises automatically accessing from storage and transmitting the personal identification number to the paging service telephone number upon subsequent entry and access from storage of the telephone number in the instrument; and an element for connecting the paging instrument to the paging service telephone number.

7. A method of enabling automatic performance of functions of an instrument which comprises a wireless telephone which includes a display screen, and an element for displaying the telephone number on the display screen, in a system which comprises an element for enabling entry and storage in the instrument of information relating to a party which comprises a telephone number, and information associated with the telephone number which comprises the name of the party associated with the telephone number, and an element for performing automatically a function in connection with the associated information upon subsequent entry of the telephone number in the instrument to access the telephone number from storage and to automatically perform the associated information function, which comprises automatically accessing from storage and displaying the name of the party associated with the telephone number along with the entered telephone number on the display upon subsequent entry and access from storage of the telephone number, wherein the method comprises:

entering the telephone number, and the name of the party associated with the telephone number, in the wireless telephone;

subsequently entering the telephone number in the wireless telephone; and automatically accessing from storage and displaying the name of the party associated with the telephone number along with the entered telephone number upon subsequent entry and access from storage of the telephone number.

8. A method of enabling automatic performance of functions of an instrument which comprise a paging instrument, in a system which comprises an element for enabling entry and storage in the instrument of information relating to a party which comprises a telephone number of a paging service, and information associated with the telephone number which comprises a personal identification number, and an element for performing automatically a function in connection with the associated information upon subsequent entry of the telephone number in the instrument to access the telephone number from storage and to automatically perform the associated information function which comprises automatically accessing from storage and transmitting the personal identification number to the paging service telephone number upon subsequent entry and access from storage of the telephone number in the instrument, and an element for connecting the instrument to the telephone number, wherein the method comprises:

entering the telephone number of a paging service, and a personal identification number, in the paging instrument;

subsequently entering the telephone number of the paging service in the paging instrument, accessing the paging service telephone number from storage, and connecting the paging instrument to the paging service telephone number; and automatically transmitting the personal identification number to the connected paging service telephone number upon subsequent entry and access from storage of the paging service telephone number an connection with the paging service.

9. The method of claim 8, wherein the instrument further comprises a display screen, and means for displaying the entered paging service telephone number on the display screen, further comprising the step of displaying the entered paging service number on the display screen.

10. The method of claim 8, wherein the displaying means are further adapted to display the personal identification number, further comprising the step of displaying the entered personal identification number on the display screen.

* * * * *